(12) United States Patent
Garcia Simon et al.

(10) Patent No.: US 7,021,474 B2
(45) Date of Patent: Apr. 4, 2006

(54) MODULAR SYSTEM FOR PARKING AND STORING BICYCLES

(76) Inventors: Esteben Garcia Simon, C/ Dr. Fleming 12, 3° Dcha, Guadalajara E-19003 (ES); Ramon Garcia Simon, C/ Dr. Fleming 12, 3° Dcha, Guadalajara E-19003 (ES)

( * ) Notice: Subject to any disclaimer, the term of this patent is extended or adjusted under 35 U.S.C. 154(b) by 180 days.

(21) Appl. No.: 10/477,789

(22) PCT Filed: May 9, 2002

(86) PCT No.: PCT/ES02/00219

§ 371 (c)(1),
(2), (4) Date: Nov. 13, 2003

(87) PCT Pub. No.: WO02/095168

PCT Pub. Date: Nov. 28, 2002

(65) Prior Publication Data

US 2004/0129656 A1 Jul. 8, 2004

(30) Foreign Application Priority Data

May 18, 2001 (ES) .............................. 200101135

(51) Int. Cl.
*A47F 7/00* (2006.01)

(52) U.S. Cl. .......................................... 211/20; 211/22

(58) Field of Classification Search .................. 211/17, 211/20, 22, 19; 224/42.12, 42.13, 42.14, 224/924, 412; D12/115
See application file for complete search history.

(56) References Cited

U.S. PATENT DOCUMENTS

| | | | | |
|---|---|---|---|---|
| 556,758 A * | 3/1896 | Lefebre | ........................ | 211/22 |
| 612,663 A * | 10/1898 | Haubs | ........................ | 211/20 |
| 3,879,027 A * | 4/1975 | Thurmond, Jr. | ............... | 211/22 |
| 3,942,646 A * | 3/1976 | Nelson et al. | ............... | 211/20 |
| 4,316,544 A * | 2/1982 | Goldstein | ................... | 211/19 |
| 4,733,810 A * | 3/1988 | Graber et al. | ................. | 211/17 |
| 5,570,825 A * | 11/1996 | Cona | .......................... | 224/495 |
| 5,690,234 A * | 11/1997 | Rhead et al. | ................. | 211/22 |
| 5,833,074 A * | 11/1998 | Phillips | ........................ | 211/21 |
| 5,988,403 A * | 11/1999 | Robideau | ..................... | 211/20 |
| 6,336,562 B1 * | 1/2002 | Mori | ............................ | 211/20 |
| 6,755,309 B1 * | 6/2004 | Runge | ........................ | 211/20 |

FOREIGN PATENT DOCUMENTS

DE 4235158 A1 * 4/1994
GB 2277722 A * 11/1994

* cited by examiner

Primary Examiner—Hugh B. Thompson, II (57) ABSTRACT

Modules formed of a triangular base having horizontal and sloping runners along which the wheels of the bicycle run when it is pushed up to its inclined parking-storage position, as well as having elements that limit the end position of the pedals when the bicycles is pushed along the runners, so that one of them remains above the axis of rotation and the other below, where the modules are each housed in containers or lockers which, when juxtaposed, form either linear structures, accessible from the front or back, or circular ones.

17 Claims, 7 Drawing Sheets

MODULAR SYSTEM FOR PARKING AND STORING BICYCLES

The object of the present patent is a modular system for parking-storing bicycles and more specifically a container or modular locker provided with suitable special means for parking or storing a bicycle inside, in an absolutely secure and reliable fashion, said container or locker being apt for coupling to other identical ones to form a battery consisting of an indefinite number of them.

There already exist systems for parking bicycles.

Most of them consist of more or less complete and generally metal devices, to which the bicycles are secured by means of chains or anti-theft devices. These systems offer a certain protection against overall theft but very little against theft of parts, vandalism and the elements.

Other "container" or "locker" type systems in use basically consist of a box fixed to the ground or to a wall in which the bicycle is enclosed. These systems have the drawback that they are usually expensive to build and, what is more, require a lot of space for each bicycle stored, which impedes their widespread use as an item of urban furniture.

Finally, there are also systems based on hanging the bicycle to keep it in a vertical position or with one or two of its components folded. These systems are usually confined either to long-term storage or indoors since they are inconvenient or even awkward to use for many people.

The present patent sets out to overcome all the drawbacks of already known systems, providing a new bicycle parking-storage system that permits optimum utilisation of space, which offers integrated protection for bicycles against theft, vandalism and the elements, both in public and semi-public places, which is simple and convenient to use and maintain, even by physically frail persons, and which provides high flexibility of installation and use as urban furniture. It is therefore worthy of the registration protection being applied for.

The system in question is essentially characterised in that it is built of modules each formed of a generally triangular-shaped base on which is anchored a strut or upright that, like the base, acts as a support for horizontal or upward sloping runners along which the wheels of the bicycle run when it is pushed up to occupy the inclined position in which it is to be parked or stored, said base also being provided with elements, on other struts or uprights, that take up and guide the pedals, or restrict their movement, when the bicycle is pushed along the runners, until they reach an end position in which one of them is situated above the axis of rotation and the other below.

According to another feature of the invention, said elements, located on either side of the bicycle wheel guide runners, each consist of bars or plates, anchored vertically on the base and provided with a double elbow, which are moved in respective of one other and arranged in such a way that their respective elbows are also opposite each other, so that these elbows determine the spaces in which the pedals have to be situated, in a pre-set position, when the bicycle is put into the module.

According to a further feature of the invention, the afore-mentioned bars are arranged parallel to one other and are each fitted with horizontal appendices determining the place in which the pedals have to be located, in a pre-set position, when the bicycle is put into the module.

According to another feature of the invention, the aforesaid vertical bars or plates each have slip bands which follow approximately the line of movement of the axis of rotation of the pedals and force them to slide, according to their natural movement and utilising the bicycle input thrust, until they reach the required positions, defined by the above-mentioned elbows.

According to a further feature of the invention, one of the afore-mentioned slip bands is composed of a dished downward oriented guide plate and the other slip band is made up of a slightly dished guide plate of generally horizontal orientation and a second basically C-shaped plate, which is jointed to one of the ends of the first plate and is able to turn back and forth between a generally vertical, home position and another slightly set-back position, in which it enters into contact with a spring or thrust element that returns it to its home position so that it may, when required, receive one of the pedals and force it to move downwards and remain behind the opposite one, in the direction of bicycle advance into the module.

According to another feature of the invention, the guide runners include at least one upward sloping section, up which one of the wheels of the bicycle runs when it enters the module, and a section fixed horizontally to the base and situated in line with the former, on which the other wheel of the bicycle rests in the end parking or storage position.

According to another feature of the invention, the upward sloping guide runner section is topped at its upper end by another appreciably horizontal or slightly downward sloping section on which the wheel that has previously ascended the aforesaid inclined section rests in the end bicycle parking position.

According to another feature of the invention, the runner section fixed to the base is situated in a position adjacent to the lower end of the upward sloping section of runner.

According to another feature of the invention, the aforesaid runner section fixed to the base has pronounced stepping that assists the anchoring of the bicycle wheel onto this section.

According to another feature of the invention, the afore-mentioned section of runner attached to the base is jointed to this at its front end, which enables it to turn from the horizontal position, in which one wheel is housed, and the inclined position, in which it acts as a continuation to the section of upward sloping runner.

According to another feature of the invention, the section of runner jointed to the base has an adjacent lever or pedal which enables the user to move this section of runner between its two possible positions.

According to another feature of the invention, the section of upward sloping runner has a slight bend or elbow at the top end in the direction of the longitudinal axis of the module to leave both wheels of the bicycle facing each other.

According to another feature of the invention, this section of upward sloping runner has a slight bend or elbow at the top end in the direction of the longitudinal axis of the module to balance the position of the pedals on the axis of the module.

According to another feature of the invention, the modules include one or more suitably arranged yokes for securing one or both wheels of the bicycle.

According to another feature of the invention, the modules, whether or not provided with individual covers, may be juxtaposed to one another and, when they are so, share their respective elbow bars, while the slip bands of adjoining modules are arranged suitably to direct the pedals of each bicycle to the spaces provided.

According to another feature of the invention, the modules are each housed in containers or lockers which, being juxtaposed and suitably attached to one another, form linear structures, if they are joined in successively opposed orientations, or circular ones, if they are joined with the bases coinciding at their vertices, in the former case with the access doors to the modules having the structure either at the front or the back.

According to a final feature of the system that is the object of the invention, in the assembly formed by means of the linear juxtaposition of a number of modules, the pedal slip bands and the bicycle wheel guide runners are arranged in successively inverted positions in order that the bicycles may be parked successively also in opposing directions and with opposite inclinations when it comes to juxtaposing the containers or lockers and making them accessible from the front or back of the same structure.

The features of the system in question are described below with reference to the figures in the adjoining sheets of drawings illustrating the different modes of embodiment of the invention put forward by way of example and not on a restrictive basis, so that their possible versions, as long as they are merely incidental and do not lead to a different new industrial result, should be included within the scope of protection stemming from the registration being applied for.

Figure 1:
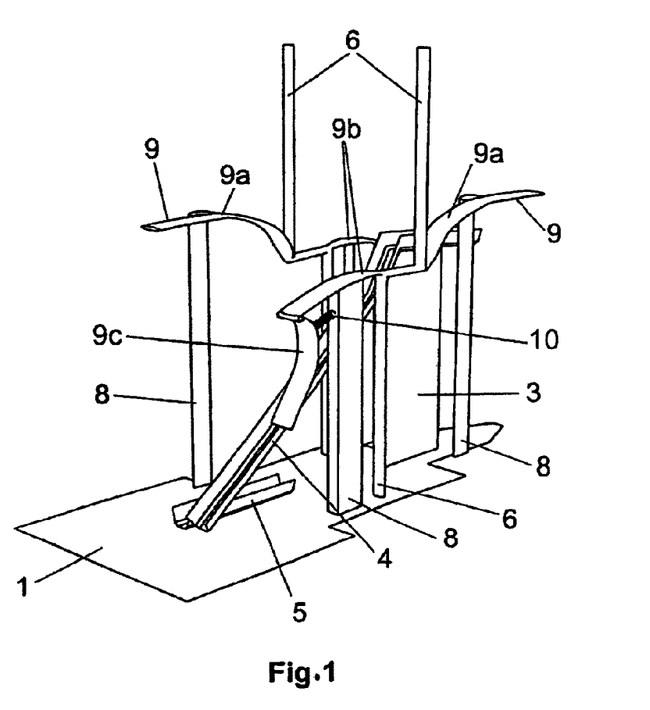
FIG. 1 shows a perspective view of a module referring to a first example of embodiment of the system according to the invention, withdrawn from the container or locker that acts as its housing and provided with the means necessary for parking-storage of a bicycle and to co-operate, furthermore, in the parking-storage of another two bicycles each in respective analogous adjoining modules.
Figure 2:
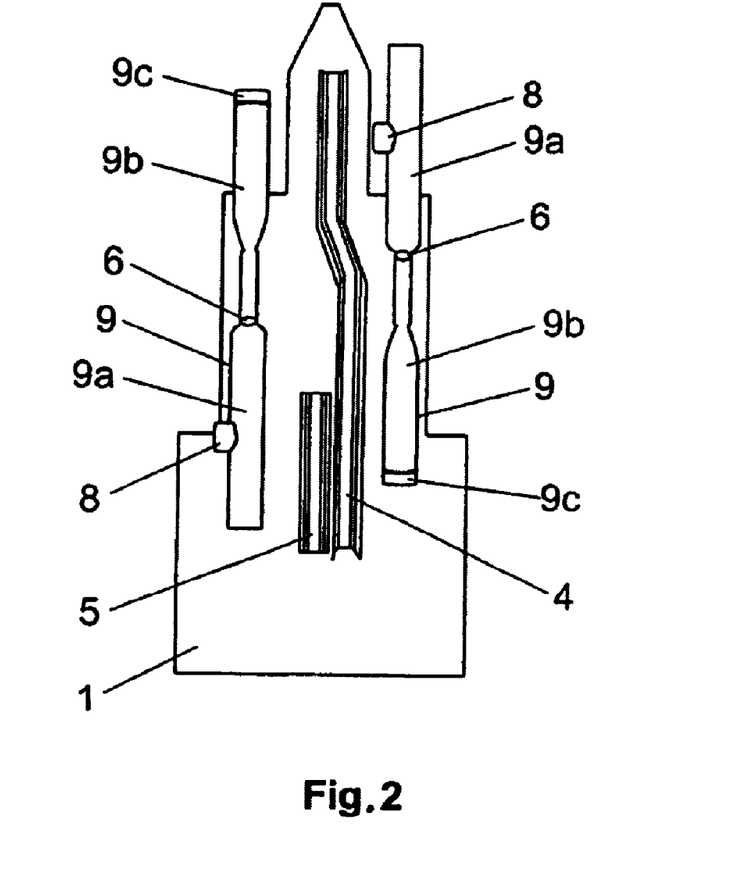
FIG. 2 shows a plan view of the module illustrated in FIG. 1.
Figure 3:
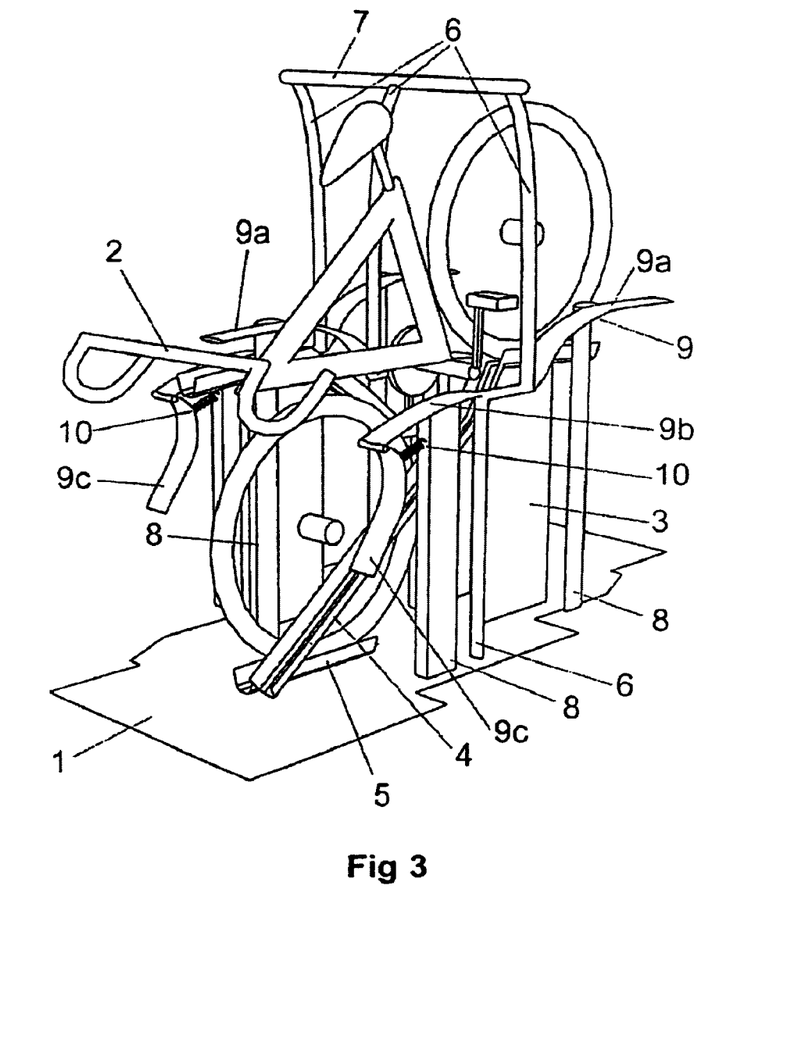
FIG. 3 shows a perspective view, similar to that of FIG. 1, illustrating two assembled modules designed for the parking-storage of two bicycles and to co-operate in the parking-storage of another two, with one of them already installed or parked in one of the two modules.

In the specimen embodiment illustrated in FIGS. 1, 2 and 3, the module according to the system that is the object of the invention is made up of a generally triangular-shaped base, the shape and area of which indicate approximately the space occupied by this module, on which a strut or upright (3) is anchored vertically so as to act as a support for a runner (4), of plastic or metallic material, which takes on a general obtuse-angled shape with uneven sides, the smaller of which rests in a slightly backward sloping position on the aforesaid strut or upright 3, while the longer side, which is connected to the smaller one by way of a wide-angled elbow, extends in a slanting direction until reaching the base 1. Fixed on this base, in a position adjacent to the end of the above-mentioned runner 4, there is another short straight runner (5), arranged parallel to the aforesaid runner 4.

Also anchored to base 1, on both sides of the runner 4, there are vertical bars or plates (6) which have a double elbow in the middle, said bars or plates being displaced in respect of each other and arranged so that their respective elbows are also opposite each other, while these vertical bars or plates 6 of all the assembled modules may be joined at their respective ends by means of a tie rod (7) connecting them.

Figure 9:
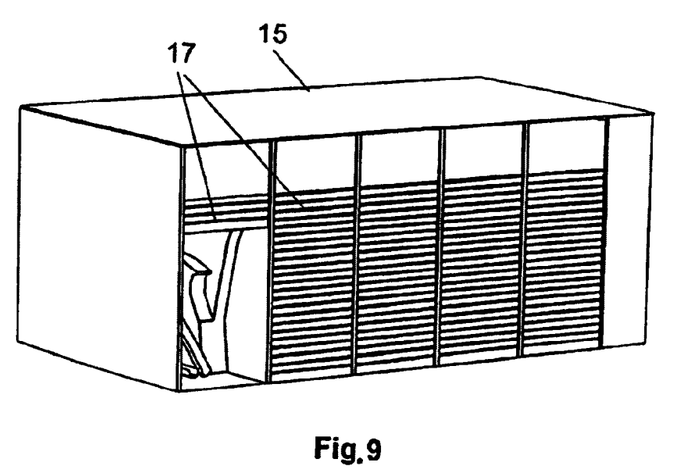
FIG. 9 shows a perspective view of a rectangular plan structure formed by joining or juxtaposing different containers or lockers, one of which is partly open so that we may see the interior arrangement of a module like that illustrated in FIG. 1.

Other struts or uprights (8) are also anchored at the base 1 in suitable positions to act as a support, on both sides of runners 4 and 5, for both slip bands (9), which extend at different heights from the elbows of the above-mentioned bars or plates 6 and which are made up, in the case of one of them (9a) of a dished plate with a downward orientation, and of the other (9b) of a slightly dished plate with a generally horizontal orientation, which is provided at the end with another jointed plate (9c), basically of a very open C shape, which slopes downwards and is able to turn between a generally vertical home position and another slightly set-back position in which it comes into FIG. 9 shows a perspective view of a rectangular plan structure formed by joining or juxtaposing different containers or lockers, one of which is partly open so that we may see the interior arrangement of a module like that illustrated in FIG. 1.

Figure 8:
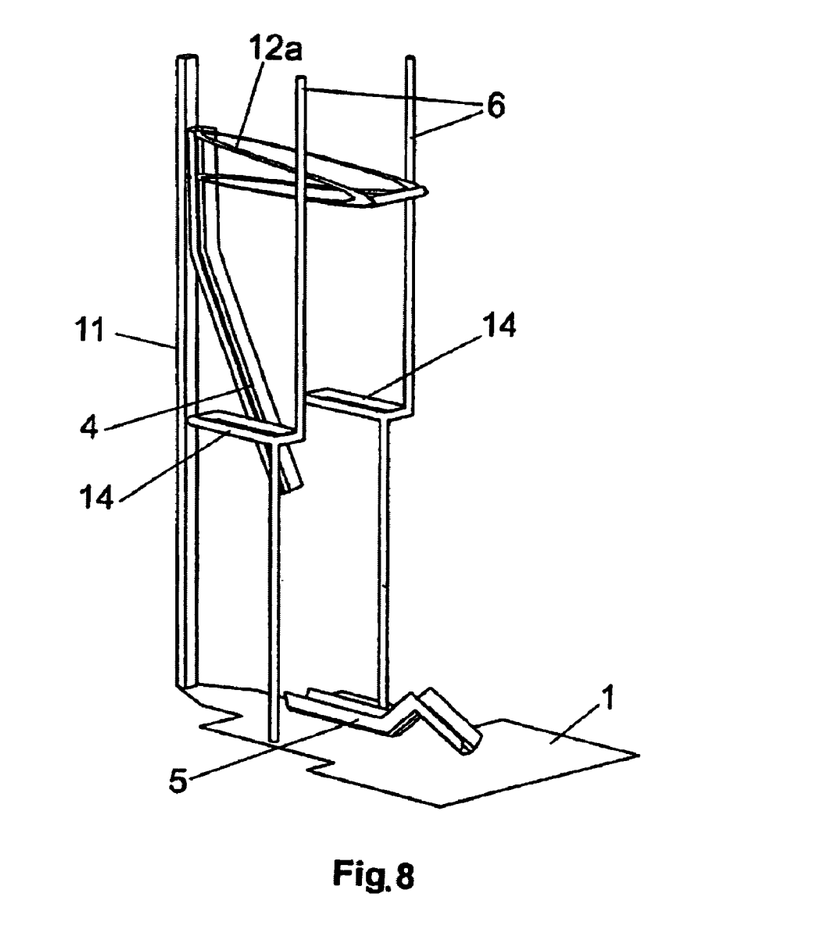
FIG. 8 shows a perspective view of a module referring to a fourth specimen embodiment of the system according to the invention., also withdrawn from the container or locker in which it is normally housed and without the bicycle being installed or fitted in it.
Figure 10:
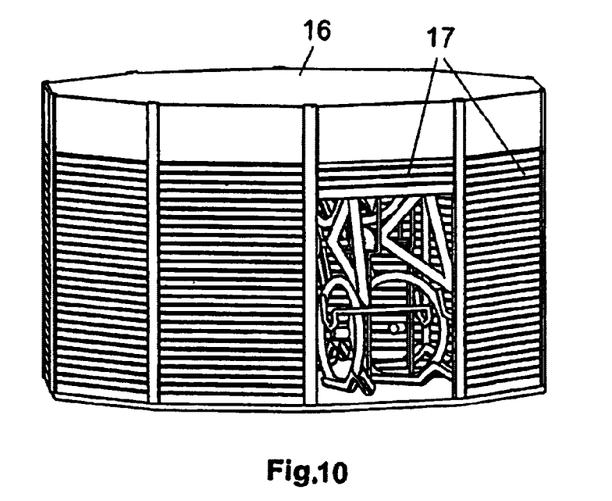
FIG. 10 represents a perspective view of another circular plan structure formed by joining or juxtaposing different containers or lockers, one of which is partly open so that we may see the interior arrangement of various modules, also juxtaposed, without interior partitions, of the type illustrated in FIG. 8, each with a bicycle installed or fitted in it In these figures the same or equivalent parts or elements are designated with the same reference numbers of signs.

FIG. 10 represents a perspective view of another circular plan structure formed by joining or juxtaposing different containers or lockers, one of which is partly open so that we may see the interior arrangement of various modules, also juxtaposed, without interior partitions, of the type illustrated in FIG. 8, each with a bicycle installed or fitted in it In these figures the same or equivalent parts or elements are designated with the same reference numbers of signs.

In the specimen embodiment illustrated in FIGS. 1, 2 and 3, the module according to the system that is the object of the invention is made up of a generally triangular-shaped base, the shape and area of which indicate approximately the space occupied by this module, on which a strut or upright (3) is anchored vertically so as to act as a support for a runner (4), of plastic or metallic material, which takes on a general obtuse-angled shape with uneven sides, the smaller of which rests in a slightly backward sloping position on the aforesaid strut or upright 3, while the longer side, which is connected to the smaller one by way of a wide-angled elbow, extends in a slanting direction until reaching the base 1. Fixed on this base, in a position adjacent to the end of the above-mentioned runner 4, there is another short straight runner (5), arranged parallel to the aforesaid runner 4.

Also anchored to base 1, on both sides of the runner 4, there are vertical bars or plates (6) which have a double elbow in the middle, said bars or plates being displaced in respect of each other and arranged so that their respective elbows are also opposite each other, while these vertical bars or plates 6 of all the assembled modules may be joined at their respective ends by means of a tie rod (7) connecting them.

Other struts or uprights (8) are also anchored at the base 1 in suitable positions to act as a support, on both sides of runners 4 and 5, for both slip bands (9), which extend at different heights from the elbows of the above-mentioned bars or plates 6 and which are made up, in the case of one of them (9a) of a dished plate with a downward orientation, and of the other (9b) of a slightly dished plate with a generally horizontal orientation, which is provided at the end with another jointed plate (9c), basically of a very open C shape, which slopes downwards and is able to turn between a generally vertical home position and another slightly set-back position in which it comes into contact with a spring or thrust element (10) that returns it to its generally vertical home position.

In the assembly formed through the linear juxtaposition of a number of modules, as illustrated in FIGS. 1 and 2—a juxtaposition which is represented for two modules in FIG. 3—the vertical bars are shared and the slip bands are arranged in successively inverted positions, so that the slip band 9 plate 9b of a module is situated after the slip band 9 plate 9a of the adjacent module, forming a continuous whole with the form as shown in the figures. In this way, the slip band that occupies the first place presents the C-shaped plate 9c situated at the front and the dished plate 9a situated at the back; the slip band occupying the second place presents the C-shaped plate 9c situated at the back and the dished plate 9a situated at the front; the slip band occupying the third place takes up the position of the first one again, and so on and so forth.

Accordingly, in this linear succession of modules the runners 4 and 5 and the input opening to each module are arranged in successively inverted positions, i.e. between the slip bands that occupy first and second places—corresponding to the first module assembled—runner 5 and the input opening are situated at the rear of the structure and runner 4 is angled from back to front; between the slip bands occupying the third and fourth places—corresponding to the third module assembled—both runners and the input opening occupy the same positions again as those of the first module, and so on and so forth.

This reversal of positions in the adjoining modules assembled in a line and in their components enables bicycles to be parked or stored in opposite directions—i.e. facing first the front and then the back successively—and with opposing inclinations as well, which means that better use is made of space.

In this specimen embodiment of the system the bicycle is pushed so that its front wheel moves along runner 5, in which it has to be located, and its rear wheel runs up the sloping runner 4, passes over its elbow and ends up on the shorter side of this runner, inclined backwards slightly for securer fastening.

During the movement of the bicycle to set it in its end parking or storage position, depending on the angle of the pedals, two things may happen: one of them may come up against the plate 9a of one of the slip bands or that the other may do so with the C-shaped plate 9c of the other slip band. In the former case, taking advantage of the backward thrust of the bicycle and the ability of the pedal to turn backwards freely as well, that plate 9a directs the pedal downwards so that it runs below the above-mentioned plate 9a; in the latter case, the C-shaped plate 9c receives and guides the respective pedal—in those positions in which the other pedal 9a would be at an angle that would lock the movement of the assembly—moving it back so as to get past these positions, prevent locking and finally pass over the plate 9b.

The function of the slip bands is, therefore, to make sure that, in the bicycle rest position, one of the two pedals is always above the axis of rotation and the other below. In this way, the elbow spaces not occupied by the pedals are available for the pedals of the bicycle that is located in the adjoining position.

Figure 4:
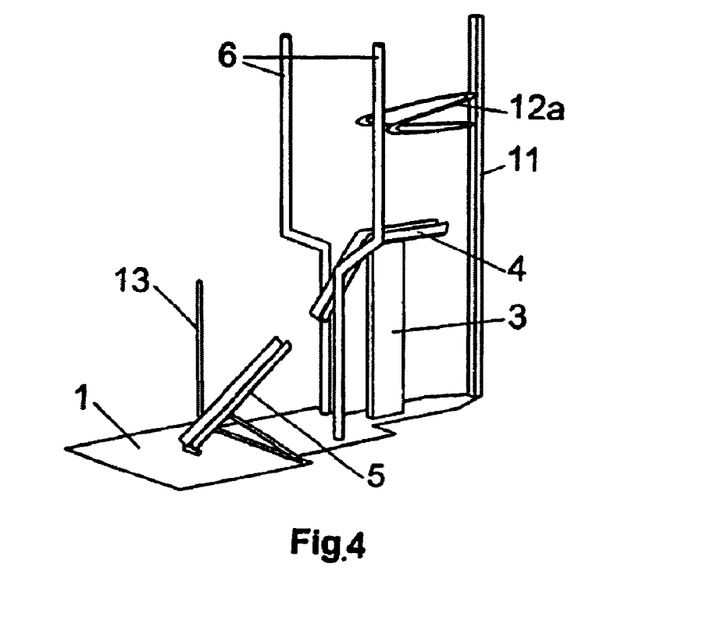
FIG. 4 shows a view, similar to that of FIG. 1, illustrating a module referring to a second example of embodiment of the system according to the invention.
Figure 5:
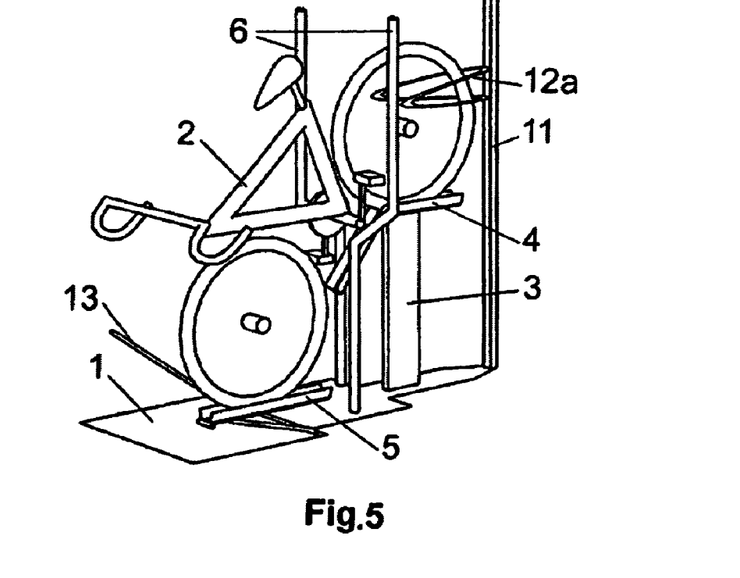
FIG. 5 shows a perspective view of the same module illustrated in FIG. 4 with a bicycle installed or parked in it.

In the specimen embodiment illustrated in FIGS. 4 and 5, at its rear vertex base 1 has a strut or upright (11) anchored vertically with a special purpose yoke (12a) attached to the front for securing the wheel of the bicycle (2) housed in the upper section of the runner.

At a certain distance from the strut or upright 11 and on both sides of same the vertical bars 6 already described, with a double obtuse angle and without the slip bands described in relation to the previous specimen embodiment, are anchored to the base.

Between the strut or upright 11 and the bars 6 base 1 is also provided with another strut or upright 3 to which a runner 4 is attached which takes on a general obtuse-angle form and which is located with one of its sides in a position inclined backwards slightly and opposite the strut or upright 11, and the other side facing towards the base 1, at the front middle part of which there is another short straight runner 5 attached of the same characteristics as the runner 4 and located in line with it.

This runner 5 may be jointed to the base 1, at its front end, by means of a support that the user may operate with a lever (13) or another device to turn the runner 5 back and forth between its horizontal position and another inclined position in which it acts as a continuation of runner 4.

In this specimen embodiment of the system the bicycle 2 is pushed backwards so that one of its wheels runs first along runner 5, set previously in its inclined position, and then ascends the front side of runner 4 until reaching its rear side, on which it will rest firmly, in an inclined position, which is when the other wheel of the bicycle will be engaged and supported on runner 5 anchored to the base, once this runner 5 has returned to its horizontal position. During the movement of the bicycle until reaching that end position, the pedals are positioned in such a way that they occupy the space permitted for them by the vertical bars 6, one of them below its double elbow and the above.

The specimen embodiment of the system illustrated in FIGS. 6 and 7 has the same form as that shown in FIGS. 4 and 5 and only differs from it in the following aspects:

Runner 4 also has the same approximate obtuse-angled form with uneven sides, though with the shorter side oriented vertically. On this shorter side, to which the yoke 12a is attached, this runner is fixed to the front of the strut or upright 11, while the longer side is oriented diagonally towards the base 1, in line with the runner 5. This runner is provided with pronounced inverted acute-angle stepping which means that the runner is divided into three sections: a front section sloping upwards from back to front, a middle section sloping downwards from back to front, and a horizontal last section.

Furthermore, the double elbow of the bars 6 is more pronounced than in the specimen embodiment in FIGS. 4 and 5, so that the middle area of these bars has a steeper inclination than in the previous specimen embodiment.

In addition, a second yoke (12b), attached to the base in line with runner 5, is intended to secure the wheel housed in this runner.

In this third specimen embodiment, bicycle 2 is pushed backwards so that its rear wheel is raised up to runner 4, along which it moves until it is clamped by the yoke 12a. At that moment, after moving along the runner 5, the front wheel reaches the last horizontal section of same and is firmly secured in it through being unable to advance over the step established in the runner and to move sideways due to the action of the yoke 12*b*.

As in the previous specimen embodiments, the arrangement of the vertical bars 6 and their elbows limits the space that the pedals may occupy when parking the bicycle in the module: one above and the other below the axis of rotation.

Figure 6:
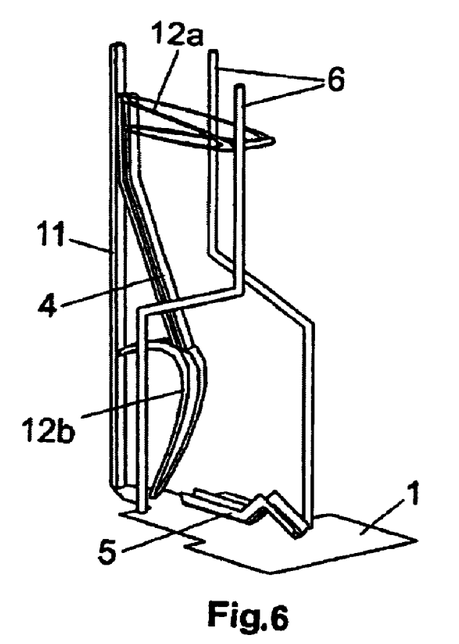
FIG. 6 shows a view, similar to that of FIG. 1, illustrating a module referring to a third example of embodiment of the system according to the invention.
Figure 7:
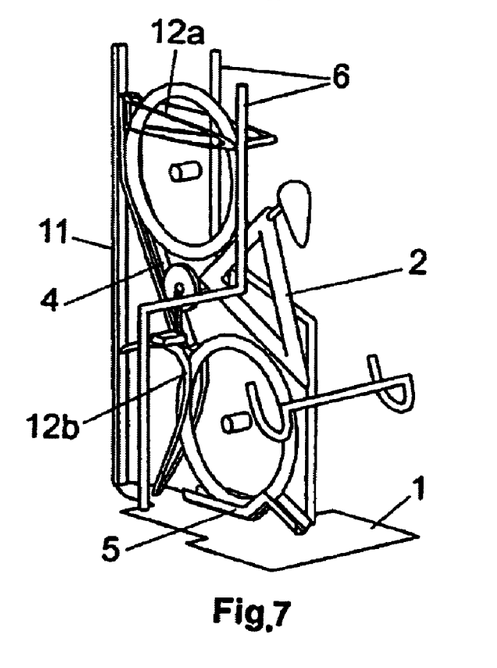
FIG. 7 shows a perspective view of the same module illustrated in FIG. 6 with a bicycle installed or parked in it.

The specimen embodiment represented in FIG. 8 is practically the same as that in FIGS. 6 and 7, from which it only differs in that the bars 6 are arranged parallel and each have, approximately halfway up, small double right-angle elbows determining the formation of short horizontal sections to each of which approximately U-shaped appendices (14) are horizontally attached, oriented horizontally towards the strut or upright 11, which limit the space that may be occupied by the pedals of the bicycle 2 in the usual position, in which one of them is above the axis or rotation and the other below.

The modules according to any of the different specimen embodiments of the system in question may be juxtaposed to one another or be each housed in containers or lockers which, when suitably juxtaposed or joined together, form linear structures (15), like the one represented in FIG. 9, or circular structures like the one illustrated in FIG. 10. In the case of the round structure represented in the latter figure, the arrangement of the bars and their elbows and appendices described in relation to FIG. 8, applied to any specimen embodiment, permits the juxtaposition of modules sharing the rear vertex so as to form the circle characteristic of the structure. In both cases, the modules of each structure have their respective access doors (17), which, in the case of a linear structure, may be situated either at the front or back of the structure in order to permit access to them according to the parking or storage position of the bicycle.

Lastly, it should be pointed out that—as incidental versions of the invention, therefore included within the scope of protection of the present patent—the possibilities should be taken into account that the modules might include hooks, anchors, chains, anti-theft devices or any other fastening elements in replacement or in addition to the yokes 12*a* and 12*b*.

The invention claimed is:

1. Modular system for the parking-storage of bicycles, characterised in that it is made up of modules each formed of a base having a generally triangular footprint on which is anchored a strut or upright, which, like the base, acts as a support for horizontal and upward sloping runners along which wheels of the bicycle move when it is pushed to take up an angled position in which it has to be parked or stored, whilst the base is also provided, on other struts or uprights, with elements which, when the bicycle is pushed along the runners, receive and guide pedals, or limit their movement, until they reach an end position in which one of the pedals is situated above an axis of rotation and the other pedal below the axis of rotation.

2. Modular system for the parking-storage of bicycles, according to claim 1, characterised further in that the elements, situated one on either side of the runners, consist of bars or plates, vertically anchored on the base and provided with a double elbow, which are placed in relation to one another and arranged so that their respective elbows are also opposite one another, so that said elbows define spaces in which the pedals have to be situated, in a pre-set position, when the bicycle is installed in one of the module.

3. Modular system for the parking-storage of bicycles, according to claim 2, characterised further in that the bars are arranged parallel and are each provided with horizontal appendices determining the place in which the pedals have to be situated, in a pre-set position, when the bicycle is installed in one of the module.

4. Modular system for the parking-storage of bicycles, according to claim 2, characterised further in that the vertical bars or plates have slip bands attached which follow approximately a line of movement of the axis of rotation of the pedals and force the pedals to slide, according to their natural movement and utlilsing bicycle input thrust, until the pedals reach required positions, defined by the elbows.

5. Modular system for the parking-storage of bicycles, according to claim 4, characterised further in that one of the slip bands is composed of a dished plate with a downward orientation and another of the slip bands is composed of one slightly dished plate with a generally horizontal orientation and a second basically C-shaped plate, which is jointed to one an end of the slightly dished plate and which is able to turn back and forth between a generally vertical home position and another slightly set-back position, in which it comes into contact with a spring or thrust element that returns it to its home position so that it may, when appropriate, receive one of the pedals and force it to move downwards and remain behind the opposite pedal, in the direction of advance of the bicycle into one of the modules.

6. Modular system for the parking-storage of bicycles, according to claim 4 or 5, characterised further in that the modules, whether or not provided with individual covers, may be juxtaposed to one another and, when they are so, share respective elbow, while the slip bands of adjacent modules are arranged suitably so as to direct the pedals of each bicycle to spaces provided.

7. Modular system for the parking-storage of bicycles, according to claim 1, characterised further in that the runners include at least one upward-sloping section up which one of the bicycle wheels ascends on entering one of the modules, and a section attached horizontally to the base and situated in line with the former, on which the other wheel of the bicycle rests in the parked or stored position.

8. Modular system for the parking-storage of bicycles, according to claim 7, characterised further in that the section of runner attached to the base is situated in a position adjacent to a lower end of the upward-sloping section of runner.

9. Modular system for the parking-storage of bicycles, according to claim 7 characterised further in that the section of runner attached to the base has pronounced stepping that improves anchoring of the bicycle wheel on that section.

10. Modular system for the parking-storage of bicycles, according to claim 7 characterised further in that the section of runner attached to the base is jointed to the base at a front end thereof, which enables the section of runner to turn between a horizontal position, in which one wheel is housed, and an inclined position, in which it acts as a continuation to the upward-sloping section of runner.

11. Modular system for the parking-storage of bicycles, according to claim 7 characterised further in that the section of runner jointed to the base has an adjacent lever or pedal that enables a user to move this section of runner between two possible positions.

12. Modular system for the parking-storage of bicycles, according to claim 7 characterised further in that a top the section of upward-sloping runner has a slight bend or elbow towards a longitudinal axis of one of the modules so as to leave both wheels of the bicycle facing each other.

13. Modular system for the parking-storage of bicycles, according to claim 12 characterised further in that the top of the sloping section of runner has a slight bend away from the longitudinal axis of one of the modules so as to balance the position of the pedals on the axis of the respective module.

14. Modular system for the parking-storage of bicycles, according to claim 1 or 7, characterised further in that the section of upward sloping wheel runner is topped by another appreciably horizontal or slightly downward section on which the wheel that has previously ascended the sloping section rests in the bicycle parked position.

15. Modular system for the parking-storage of bicycles, according to claim 1, characterised further in that the modules are fitted with one or more suitably positioned yokes for securing one or both wheels of the bicycle.

16. Modular system for the parking-storage of bicycles, according to claim 1, characterised further in that the modules are each housed in containers or lockers having access doors, the containers or lockers form a linear structure when joined in successively opposing orientations, or a circular structure when joined with the respective bases coinciding at respective vertices.

17. Modular system for the parking-storage of bicycles, characterised in that it is made up of modules each formed of a base having a generally triangular footprint on which is anchored a strut or upright, which, like the base, acts as a support for horizontal and upward sloping runners along which the wheels of the bicycle move when it is pushed to take up an angled position in which it has to be parked or stored, whilst the base is also provided, on other struts or uprights, with elements which, when the bicycle is pushed along the runners, receive and guide pedals, or limit their movement, until they reach an end position in which one of the pedals is situated above an axis of rotation and the other pedal below the axis of rotation;

characterised further in that the elements, situated one on either side of the runners, consist of bars or plates, vertically anchored on the base and provided with a double elbow, which are placed in relation to one another and arranged so that their respective elbows are also opposite one another, so that said elbows define spaces in which the pedals have to be situated, in a pre-set position, when the bicycle is installed in one of the modules;

characterised further in that the vertical bars or plates have slip bands attached which follow approximately a line of movement of the axis of rotation of the pedals and force the pedals to slide, according to their natural movement and utilising bicycle input thrust, until the pedals reach required positions, defined by the elbows;

characterised further in that the runners include at least one upward-sloping section up which one of the bicycle wheels ascends on entering one of the modules, and a section attached horizontally to the base and situated in line with the former, on which the other wheel of the bicycle rests in the parked or stored position;

characterised further in that the modules are each housed in containers or lockers having access doors, the containers or lockers form a linear structure when joined in successively opposing orientations, or a circular structure when joined with the respective bases coinciding at the respective vertices;

characterised further in the linear structure having the access doors in successively opposite positions, the slip bands and the runners are arranged in successively inverted positions in order that the bicycles may be parked in opposite directions and with opposite inclinations.

* * * * *